United States Patent
Nagase et al.

(10) Patent No.: US 8,720,986 B2
(45) Date of Patent: May 13, 2014

(54) OPENING-AND-CLOSING MEMBER CONTROL APPARATUS

(71) Applicant: Aisin Seiki Kabushiki Kasiha, Kariya (JP)

(72) Inventors: Koji Nagase, Toyota (JP); Nobuyasu Bessho, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/661,179

(22) Filed: Oct. 26, 2012

(65) Prior Publication Data

US 2013/0106144 A1 May 2, 2013

(30) Foreign Application Priority Data

Oct. 28, 2011 (JP) ................. 2011-237538

(51) Int. Cl.
  *B60J 3/02* (2006.01)
  *B60J 7/057* (2006.01)

(52) U.S. Cl.
  USPC .......................................... 296/214; 296/223

(58) Field of Classification Search
  CPC ...... B60J 7/0007; B60J 7/0015; B60J 7/0023; B60J 7/003; B60J 7/0038; B60J 7/057; B60J 7/0573
  USPC .................................. 296/214, 223
  See application file for complete search history.

(56) References Cited

U.S. PATENT DOCUMENTS 5,250,882 A 10/1993 Odoi et al.
5,372,401 A * 12/1994 Odoi et al. ................ 296/214
6,056,352 A * 5/2000 Ewing et al. ................. 296/214
2006/0066141 A1 3/2006 Fuchs et al.
2010/0308627 A1 12/2010 Horiuchi et al.

FOREIGN PATENT DOCUMENTS

| DE | 42 21 043 A1 | 1/1993 |
|---|---|---|
| DE | 102 12 006 A1 | 10/2003 |
| DE | 10 2004 041168 A1 | 3/2006 |
| JP | 4-293617 | 10/1992 |
| JP | 7-276993 | 10/1995 |
| JP | 3339695 | 8/2002 |
| JP | 4153821 | 7/2008 |
| JP | 2011-11735 | 1/2011 |

OTHER PUBLICATIONS

European Search Report dated Mar. 8, 2013, from European Patent Office in counterpart European Application No. 12190197.9-1756 (4 pages).

* cited by examiner

*Primary Examiner* — Dennis H Pedder

(74) *Attorney, Agent, or Firm* — Finnegan, Henderson, Farabow, Garrett & Dunner, LLP

(57) ABSTRACT

An opening-and-closing member control apparatus includes a panel drive device moving a movable panel in opening and closing directions, a panel monitoring device monitoring a position of the movable panel between fully closed and opened positions, a sunshade drive device moving a sunshade in opening and closing directions, a sunshade monitoring device monitoring a position of the sunshade between fully closed and opened positions, and a control device controlling driving of the panel drive device and the sunshade drive device on the basis of the position of the movable panel monitored by the panel monitoring device and the position of the sunshade monitored by the sunshade monitoring device, so that the position of the movable panel precedes the position of the sunshade toward the fully closed position when the movable panel and the sunshade move in the closing direction.

6 Claims, 6 Drawing Sheets

FIG. 7          Prior Art

OPENING-AND-CLOSING MEMBER CONTROL APPARATUS

CROSS REFERENCE TO RELATED APPLICATIONS

This application is based on and claims priority under 35 U.S.C. §119 to Japanese Patent Application 2011-237538, filed on Oct. 28, 2011, the entire content of which is incorporated herein by reference.

TECHNICAL FIELD

This disclosure generally relates to an opening-and-closing member control apparatus for controlling opening and closing operations of a movable panel and a sunshade.

BACKGROUND DISCUSSION

Various types of known sunroof apparatuses serving as opening-and-closing member control apparatuses are disclosed. For example, a known sunroof apparatus corresponding to an opening-and-closing member control apparatus is disclosed in JP3339695B (which will be hereinafter referred to as Reference 1). According to Reference 1, in order to downsize the sunroof apparatus in a vertical direction of a vehicle, the sunroof apparatus is not provided with a mechanism for moving a movable panel and a sunshade mechanically in conjunction with each other. The sunroof apparatus is configured to control driving of a panel opening/closing motor and a sunshade opening/closing motor. The panel opening/closing motor moves the movable panel in opening and closing directions and the sunshade opening/closing motor moves the sunshade in opening and closing directions. In the opening-and-closing member control apparatus of Reference 1, the sunshade moves in the opening direction electrically in conjunction with the movement of the movable panel in the opening direction (the movement in the opening direction will be hereinafter referred to as an opening operation). In addition, according to the opening-and-closing member control apparatus of Reference 1, when a sunshade closing button (an operation button) is pressed by a user in order to move the sunshade in the closing direction (the movement in the closing direction will be hereinafter referred to as a closing operation) in a condition where the movable panel is in an opened state, the closing operation of the sunshade is restricted. As a result, the movable panel is restricted from being forgotten to be closed when the closing operation of the sunshade is conducted in a condition where the movable panel is in the opened state.

Further, a sunroof apparatus corresponding to an opening-and-closing member control apparatus is disclosed in JP2011-11735A (which will be hereinafter referred to as Reference 2). According to the opening-and-closing member control apparatus of Reference 2, when a movable panel (roof panel) and a sunshade (sunshade panel) are in an opened state, the movable panel is configured to close electrically in conjunction with a closing operation of the sunshade.

Furthermore, a sunroof apparatus corresponding to an opening-and-closing member control apparatus is disclosed in JP4153821B (which will be hereinafter referred to as Reference 3). According to the opening-and-closing member control apparatus of Reference 3, in a condition where a movable panel (slide panel) is in a fully closed state, a sunshade opening operation button (an operation button) is pressed by a user; therefore, a sunshade independently opens. In addition, in a condition where the movable panel is in the fully closed state, a movable panel closing operation button (an operation button) is pressed by the user; therefore, the sunshade independently closes. Further, according to the opening-and-closing member control apparatus of Reference 3, a movable panel opening operation button (an operation button) is pressed by the user; thereby, the movable panel and the sunshade open in conjunction with each other. Furthermore, in a condition where the movable panel is in an opened state, the sunshade is configured so as not to independently close.

According to the opening-and-closing member control apparatus of each of References 1 to 3, in the condition that the movable panel and the sunshade are in a stopped state, the operation button is pressed to thereby move the movable panel and the sunshade electrically in conjunction with each other. Accordingly, after the movable panel and the sunshade start moving, a subsequent moving status of each of the movable panel and the sunshade is not specially monitored. Consequently, even in a case where a position of one of the movable panel and the sunshade is configured to precede a position of the other of the movable panel and the sunshade between a fully opened state and a fully closed state during the movement of the movable panel and the sunshade in conjunction with each other, such precedence between the position of one of the movable panel and the sunshade and the position of the other of the movable panel and the sunshade may be reversed.

In particular, as illustrated in FIG. 7, while a movable panel 91 and a sunshade 92 are moving in a closing direction in conjunction with each other, an opening amount AP2 of the sunshade 92 in an opening formed at a roof portion may become small relative to an opening amount AP1 of the movable panel 91 in the opening formed at the roof portion. Thus, the closing operation of the movable panel 91 may be delayed relative to the closing operation of the sunshade 92 (that is, a position of the movable panel 91 and a position of the sunshade 92 may be reversed during the closing operation). For example, in a case where the sunshade 92 is brought in a fully closed state before the movable panel 91 is brought in a fully closed state, a status of the movable panel 91 may not be visually checked by a user. In addition, for example, the user may incorrectly recognize that both the movable panel 91 and the sunshade 92 are brought in the fully closed state. Furthermore, for example, in a case where the movable panel 91 inappropriately moves or an obstruction is detected at the movable panel 91, the closing operation of the movable panel 91 may be stopped. As a result, the movable panel 91 is left in an opened state and thus the sunshade 92 may be contaminated by rain or dirt.

Likewise, while the movable panel 91 is moving in an opening direction in conjunction with the sunshade 92, for example, the movable panel 91 is brought in a fully opened state before the sunshade 92 is brought in a fully opened state. In such case, the sunshade 92 receives wind to therefore flutter and thus noises may be generated.

In addition, the aforementioned reversal of precedence of the position of one of the movable panel 91 and the sunshade 92 to the position of the other of the movable panel 91 and the sunshade 92 during the opening/closing operation results from a difference between rotational speeds of a panel drive motor and a sunshade drive motor for driving the movable panel 91 and the sunshade 92, respectively. The difference between the rotational speeds of the panel drive motor and the sunshade drive motor is caused by variations in motor characteristics and mechanical configurations of the panel drive motor and the sunshade drive motor, a difference between slide resistances in the operations of the panel drive motor and the sunshade drive motor, a difference between temperature characteristics of the panel drive motor and the sunshade drive motor, and the like. Therefore, even in a case where the same specifications are applied to the panel drive motor and the sunshade drive motor, a long analysis time is necessary to conform the rotational speed of the panel drive motor to the rotational speed of the sunshade drive motor.

Further, a sunroof apparatus serving as an opening-and-closing member control apparatus is disclosed in JPH4-293617A (which will be referred to as Reference 4). According to the opening-and-closing member control apparatus of Reference 4, a movable panel (sunroof) and a sunshade are configured to open and close electrically in conjunction with each other. According to Reference 4, in a condition where both the movable panel and the sunshade are in a fully closed state, the movable panel is configured to start moving in an opening direction within a predetermine time after the sunshade starts moving in an opening direction. Further, according to Reference 4, in a condition where both the movable panel and the sunshade are in a fully opened state, the sunshade is configured to start moving in a closing direction within a predetermined time after the movable panel starts moving in a closing direction. Thus, for example, at the time of moving the movable panel and the sunshade in the opening direction, the opening operation of the sunshade may precede the opening operation of the movable panel. Meanwhile, at the time of moving the movable panel and the sunshade in the closing direction, the closing operation of the movable panel may precede the closing operation of the sunshade.

Furthermore, a sunroof apparatus serving as an opening-and-closing member control apparatus is disclosed in JPH7-276993A (which will be referred to as Reference 5). According to the opening-and-closing member control apparatus of Reference 5, a movable panel (panel) tilts and slides electrically in conjunction with tilting and sliding of a sunshade. In particular, at the timing of tilting the movable panel and the sunshade, a predetermined delay time is established to thereby tilt the movable panel and the sunshade electrically in conjunction with each other.

In References 4 and 5, in the condition that the movable panel and the sunshade are in a predetermined state (for example, a fully closed state, a fully opened state, and a tilting state), the movable panel and the sunshade move even in conjunction with each other. Accordingly, according to References 4 and 5, precedence between a position of one of the movable panel and the sunshade and a position of the other of the movable panel and the sunshade during the opening/closing operation, may not be restricted from being reversed.

A need thus exists for an opening-and-closing member control apparatus, which is not susceptible to the drawback mentioned above.

SUMMARY

According to an aspect of this disclosure, an opening-and-closing member control apparatus includes a panel drive device moving a movable panel in opening and closing directions, a panel monitoring device monitoring a position of the movable panel between fully closed and opened positions, a sunshade drive device moving a sunshade in opening and closing directions, a sunshade monitoring device monitoring a position of the sunshade between fully closed and opened positions, and a control device controlling driving of the panel drive device and the sunshade drive device on the basis of the position of the movable panel monitored by the panel monitoring device and the position of the sunshade monitored by the sunshade monitoring device, so that the position of the movable panel precedes the position of the sunshade toward the fully closed position when the movable panel and the sunshade move in the closing direction.

BRIEF DESCRIPTION OF THE DRAWINGS

The foregoing and additional features and characteristics of this disclosure will become more apparent from the following detailed description considered with the reference to the accompanying drawings, wherein:

FIG. 7 is a side view illustrating a configuration of a known sunroof apparatus.

DETAILED DESCRIPTION

Figure 1A:
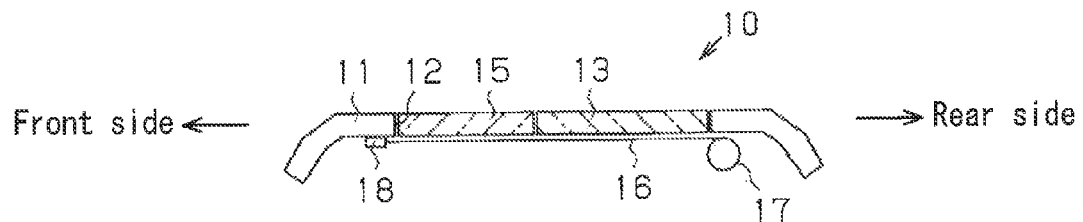
FIG. 1A is a side view schematically illustrating a sunroof apparatus according to an embodiment disclosed here.

An embodiment of this disclosure will be explained as follows with reference to FIGS. 1 to 5. Front, rear, right, left, upper, and down sides which will be described hereinafter correspond to those of a vehicle. As illustrated in FIG. 1, according to the embodiment, a sunroof apparatus 10 applied as an opening-and-closing member control apparatus of the embodiment is mounted on a roof portion 11 of a vehicle body in which an opening 12 having a substantially rectangular shape is formed and at which a fixed panel 13 is arranged. The fixed panel 13 formed by a glass panel having a substantially rectangular shape is positioned at a rear side of the opening 12 of the roof portion 11. The sunroof apparatus 10 is provided with a movable panel 15 formed, for example, by a glass panel, and a sunshade 16 formed, for example, by a fabric material. The movable panel 15 having a substantially rectangular shape moves in a front-rear direction of the vehicle to thereby open and close the opening 12. The sunshade 16 having a substantially rectangular strip shape is rolled up and out under the opening 12 and the fixed panel 13 in the front-rear direction to thereby open and close the opening 12 and the like.

Figure 1B:
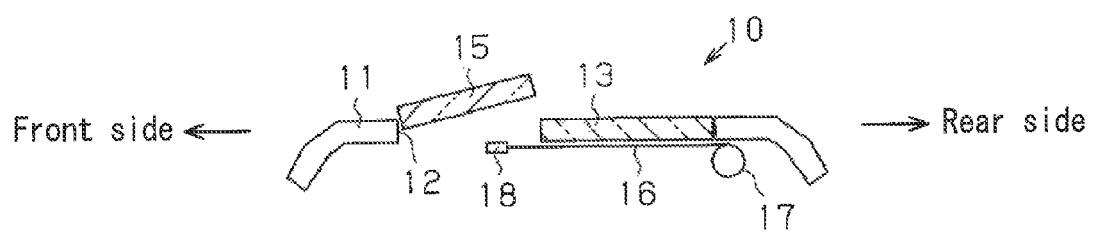
FIG. 1B is a side view schematically illustrating the sunroof apparatus according to the embodiment disclosed here.

The movable panel 15 is supported by a pair of functional brackets in a width direction of the vehicle (in a vehicle width direction). For example, when the functional brackets move in a rearward direction of the vehicle in a condition where the movable panel 15 is in a fully closed state as illustrated in FIG. 1A, the movable panel 15 rotates about a front portion thereof in one direction in such a manner that a rear portion thereof moves upward as illustrated in FIG. 1B (i.e., the movable panel 15 tilts up). Afterward, the functional brackets further move in the rearward direction. Therefore, the movable panel 15 rotates about the front portion in the other direction in such a manner that the rear portion moves downward until the movable panel 15 becomes substantially parallel with the fixed panel 13 thereabove (i.e., the movable panel 15 tilts down). Thereafter, while being kept parallel with the fixed panel 13, the movable panel 15 slides in the rearward direction to a fully opened state as illustrated in FIG. 1C.

Figure 1C:
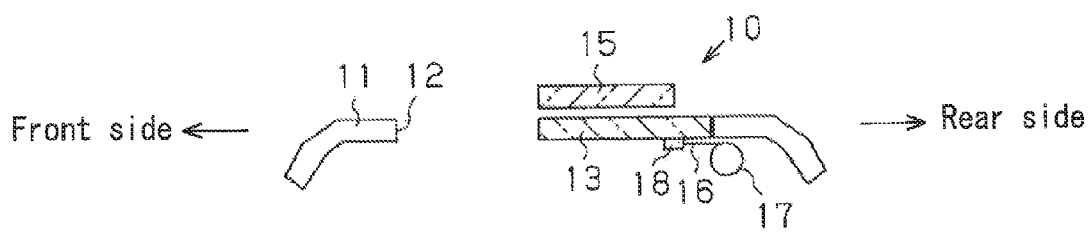
FIG. 1C is a side view schematically illustrating the sunroof apparatus according to the embodiment disclosed here.

Meanwhile, when the functional brackets move in a forward direction of the vehicle in a condition where the movable panel 15 is in the fully opened state as illustrated in FIG. 1C, the movable panel 15 slides to a position in which the tilt-down operation of the movable panel 15 is finished, while being kept parallel with the fixed panel 13. Afterward, the functional brackets further move in the forward direction; thus, the movable panel 15 tilts up as illustrated in FIG. 1B and thereafter tilts down. Then, the movable panel 15 is brought in the fully closed state as illustrated in FIG. 1A.

Thus, a movable range of each of the functional brackets in the front-rear direction is a range from a forefront position corresponding to a fully closed position (the fully closed state) of the movable panel 15, to a rearmost position corresponding to a fully opened position (the fully opened state) of the movable panel 15. The tilt-up and tilt-down operations of the movable panel 15 are realized in the meantime the functional brackets move from the forefront position to the rearmost position. In addition, the movable panel 15 slides above the fixed panel 13 (the roof portion 11) while being kept substantially parallel with the fixed panel 13. Such sliding movement of the movable panel 15 is a so-called pop-up operation.

The sunshade 16 has front and rear ends extending in the vehicle width direction. The rear end of the sunshade 16 is fixed to a roll-up shaft 17 extending in the vehicle width direction and having a substantially cylindrical shape. Side end portions of the front end of the sunshade 16 in the vehicle width direction are connected to a pair of slide members 18 arranged in the vehicle width direction. For example, when the slide members 18 move in the rearward direction in a condition where the sunshade 16 is in a fully closed state as illustrated in FIG. 1A, the sunshade 16 shifts from a state illustrated in FIG. 1B to a fully opened state illustrated in FIG. 1C while a sagging portion of the sunshade 16 is rolled up by the roll-up shaft 17. Consequently, the sunshade 16 is retracted and accommodated in a rear portion of the vehicle. As a result, an area of the roof portion 11 where the opening 12 and the fixed panel 13 are arranged is opened. In addition, a biasing means for consistently biasing the sunshade 16 in a direction to roll up the sunshade 16 is accommodated in the roll-up shaft 17.

On the other hand, when the slide members 18 move in the forward direction in a condition where the sunshade 16 is in the fully opened state as illustrated in FIG. 1C, the sunshade 16 is rolled out from the roll-up shaft 17. At this time, the sunshade 16 in the fully opened state shifts from the state illustrated in FIG. 1B to the fully closed state illustrated in FIG. 1A while being kept substantially parallel with the roof portion 11, therefore being deployed and extended forward. As a result, the area of the roof portion 11 where the opening 12 and the fixed panel 13 are arranged is closed and shielded by the sunshade 16.

As described above, a movable range of each of the slide members 18 in the front-rear direction is a range from a forefront position corresponding to a fully closed position (the fully closed state) of the sunshade 16, to a rearmost position corresponding to a fully opened position (the fully opened state) of the sunshade 16.

Figure 2:
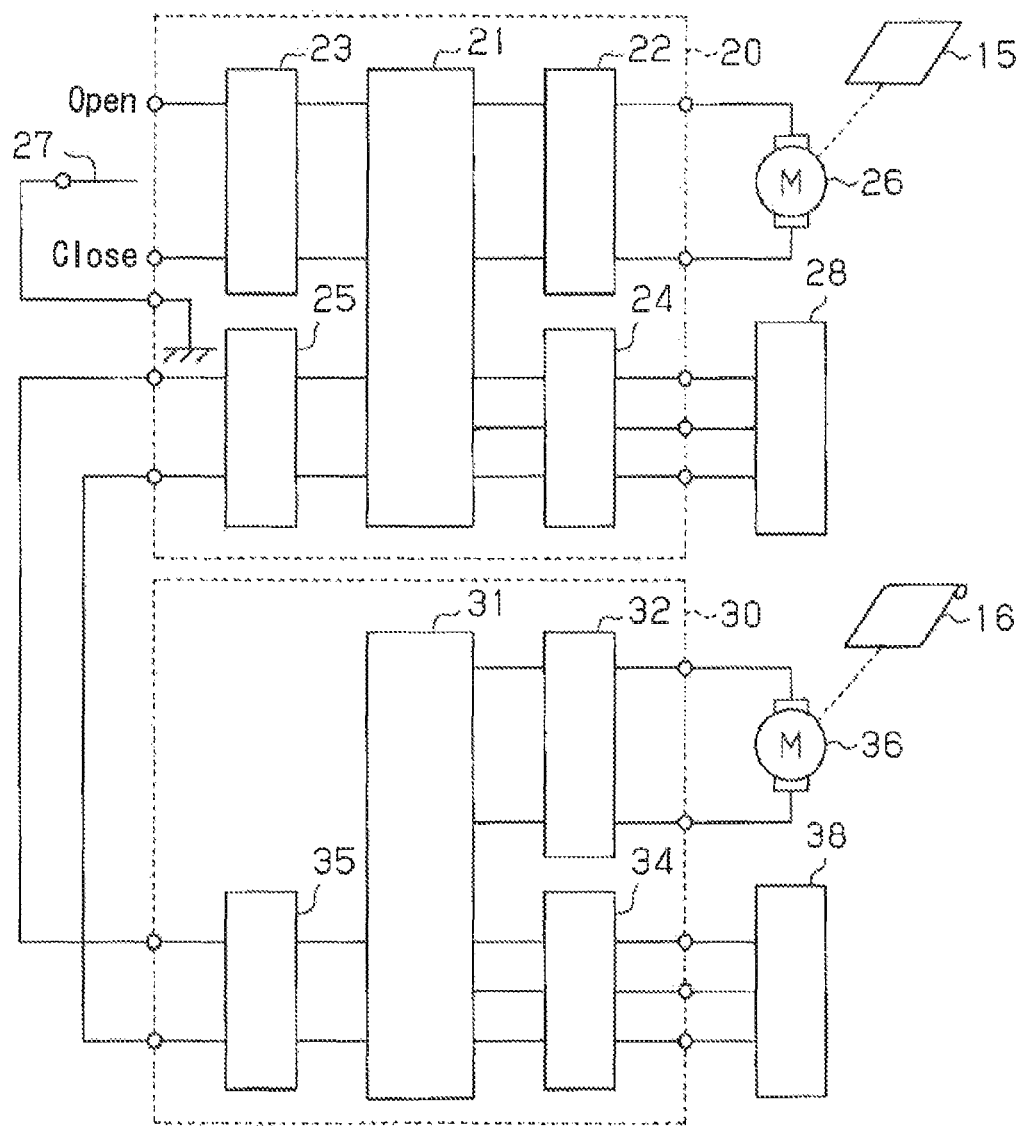
FIG. 2 is a block diagram illustrating an electrical configuration of the sunroof apparatus according to the embodiment disclosed here.

Next, an electrical configuration of the sunroof apparatus 10 according to the embodiment of the disclosure will be explained as follows. The sunroof apparatus 10 includes a panel control unit 20 serving as a panel control device. As illustrated in FIG. 2, the panel control unit 20 for controlling the opening and closing operations of the movable panel 15 is provided with a CPU (central processing unit) 21, a drive circuit 22, input circuits 23, 24, and a communication circuit 25 (serving as a communication device). The drive circuit 22, the input circuits 23, 24, and the communication circuit 25 are electrically connected to the CPU 21. The CPU 21 integrally includes functional members, for example, a ROM storing various control programs related to computing of the CPU 21, an RAM temporarily storing various data (for example, computing results), a timer, and the like.

The CPU 21 is connected via the drive circuit 22 to a panel drive motor 26 serving as a panel drive device. The drive circuit 22 reverses a polarity of a voltage applied to a battery of the panel drive motor 26, on the basis of a duty value DUTY of an output from the CPU 21. In addition, the drive circuit 22 converts an on/off ratio (a duty ratio) so as to apply the voltage to the battery or so as not to apply the voltage to the battery. In other words, the polarity of the voltage applied to the battery of the panel drive motor 26 is controlled on the basis of the duty value DUTY of the output from the CPU 21; thereby, a rotational direction (a normal or reverse rotation) of the panel drive motor 26 is controlled. In addition, the duty ratio is controlled (a so-called PWM control is conducted); thereby, an average voltage supplied to the battery, that is, a rotational speed (a speed) Np of the panel drive motor 26 is controlled.

The panel drive motor 26 is mechanically connected to the movable panel 15 (the functional brackets) and the movable panel 15 moves in an opening or closing direction depending on the rotational direction of the panel drive motor 26 when the panel drive motor 26 is rotationally driven. Accordingly, a rotational position Ap of the panel drive motor 26 basically corresponds to an opened/closed state (opened/closed position) of the movable panel 15. In addition, a rotation range of the panel drive motor 26 is a range from a foremost rotational position FMp corresponding to the foremost position of the functional bracket (the fully closed state of the movable panel 15) to a rearmost rotational position RMp corresponding to the rearmost position of the functional bracket (the fully opened state of the movable panel 15).

The CPU 21 is connected via the input circuit 23 to an open/close button 27. The CPU 21 detects presence/non-presence of an opening/closing operation relative to the movable panel 15 on the basis of a signal from the open/close button 27.

Further, the CPU 21 is connected via the input circuit 24 to a pulse sensor 28 serving as a panel monitoring device. The CPU 21 detects the rotational position Ap and the rotational speed Np of the panel drive motor 26 on the basis of a pulse signal from the pulse sensor 28. In other words, the pulse sensor 28 is provided with a pair of hall elements arranged in facing manner on an outer circumferential surface of an annular magnet rotatably driven by the panel drive motor 26. The polarity of the magnet shifts between north and south poles depending on predetermined rotational angles. Pulse signals having different phases are outputted from the hall elements depending on the predetermined rotational angles of the magnet, that is, depending on rotational angles of the panel drive motor 26. Thus, the CPU 21 counts rising edges (or falling edges) of one of the pulse signals, thereby detecting the rotational position Ap of the panel drive motor 26. Further, the CPU 21 detects the rotational speed Np of the panel drive motor 26 on the basis of a time interval of the rising edges (or falling edges). Furthermore, the CPU 21 detects the rotational direction (the normal or reverse rotation) on the basis of the difference between the phases of the pulse signals. In addition, the rotational position Ap, the rotational speed Np, and the rotational direction of the panel drive motor 26 basically correspond to an opened/closed state, an opening/closing speed, and the opening/closing direction of the movable panel 15.

According to the embodiment, the sunroof apparatus 10 includes a sunshade control unit 30 serving as a sunshade control device. The CPU 21 is connected via the communication circuit 25 to the sunshade control unit 30 for controlling the opening and closing operations of the sunshade 16. In other words, the sunshade control unit 30 is provided with a CPU 31, a drive circuit 32, an input circuit 34, and a communication circuit 35 (serving as the communication device). The drive circuit 32, the input circuit 34, and the communication circuit 35 are electrically connected to the CPU 31. The CPU 31 is connected via the communication circuit 35 to the communication circuit 25 of the panel control unit 20.

Furthermore, the CPU 31 is connected via the drive circuit 32 to a sunshade drive motor 36 serving as a sunshade drive device. The drive circuit 32 reverses a polarity of a voltage applied to a battery of the sunshade drive motor 36, on the basis of a duty value DUTY of an output from the CPU 31. In addition, the drive circuit 32 converts an on/off ratio (a duty ratio) so as to apply the voltage to the battery or so as not to apply the voltage to the battery. In other words, the polarity of the voltage applied to the battery of the sunshade drive motor 36 is controlled on the basis of the duty value DUTY of the output from the CPU 31; thereby, a rotational direction (a normal or reverse rotation) of the sunshade drive motor 36 is controlled. In addition, the duty ratio is controlled (a so-called PWM control is conducted); thereby, an average voltage supplied to the battery, that is, a rotational speed (a speed) Ns of the sunshade drive motor 36 is controlled.

The sunshade drive motor 36 is mechanically connected to the sunshade 16 (the slide members 18) and the sunshade 16 moves in an opening or closing direction depending on the rotational direction of the sunshade drive motor 36 when the sunshade drive motor 36 is rotationally driven. Accordingly, a rotational position As of the sunshade drive motor 36 basically corresponds to an opened/closed state (an opened/closed position) of the sunshade 16. In addition, a rotation range of the sunshade drive motor 36 is a range from a foremost rotational position FMs corresponding to the foremost position of the slide member 18 (the fully closed state of the sunshade 16) to a rearmost rotational position RMs corresponding to the rearmost position of the slide member 18 (the fully opened state of the sunshade 16).

In addition, the CPU 31 is connected via the input circuit 34 to a pulse sensor 38 serving as a sunshade monitoring device. The CPU 31 detects the rotational position As and the rotational speed Ns of the sunshade drive motor 36 on the basis of a pulse signal from the pulse sensor 38. A configuration of the pulse sensor 38 is similar to that of the pulse sensor 28; therefore, the rotational position As, the rotational speed Ns, and the rotational direction of the sunshade drive motor 36 basically correspond to an opened/closed state, an opening/closing speed, and the opening/closing direction of the sunshade 16.

The CPUs 21, 31 share information thereof with each other via the communication circuits 25, 35. In particular, the CPU 21 at the panel control unit 20 receives various types of information indicating the rotational position As and the rotational speed Ns of the sunshade drive motor 36, from the CPU 31 at the sunshade control unit 30. Meanwhile, the CPU 31 at the sunshade control unit 30 receives various types of information indicating the presence/non-presence of the opening/closing operation relative to the movable panel 15 and the like, and the rotational position Ap and the rotational speed Np of the panel drive motor 26, from the CPU 21 at the panel control unit 20. For example, in a case where the open/close button 27 is pressed by a user or driver of the vehicle for the opening operation, the CPUs 21, 31 control driving of the panel drive motor 26 and the sunshade drive motor 36, respectively, so that the movable panel 15 and the sunshade 16 move in the opening direction in conjunction with each other. Meanwhile, for example, in a case where the open/close button 27 is pressed by the user or driver of the vehicle for the closing operation, the CPUs 21, 31 control the driving of the panel drive motor 26 and the sunshade drive motor 36, respectively, so that the movable panel 15 and the sunshade 16 move in the closing direction in conjunction with each other.

Here, in the case of the closing operation, the CPUs 21, 31 control the driving of the panel drive motor 26 and the sunshade drive motor 36, respectively, in such a way that a position of the movable panel 15 precedes a position of the sunshade 16 toward the fully closed position in the closing direction. Meanwhile, in the case of the opening operation, the CPUs 21, 31 control the driving of the panel drive motor 26 and the sunshade drive motor 36, respectively, in such a way that a position of the sunshade 16 precedes a position of the movable panel 15 toward the fully opened position in the opening direction.

Figure 3:
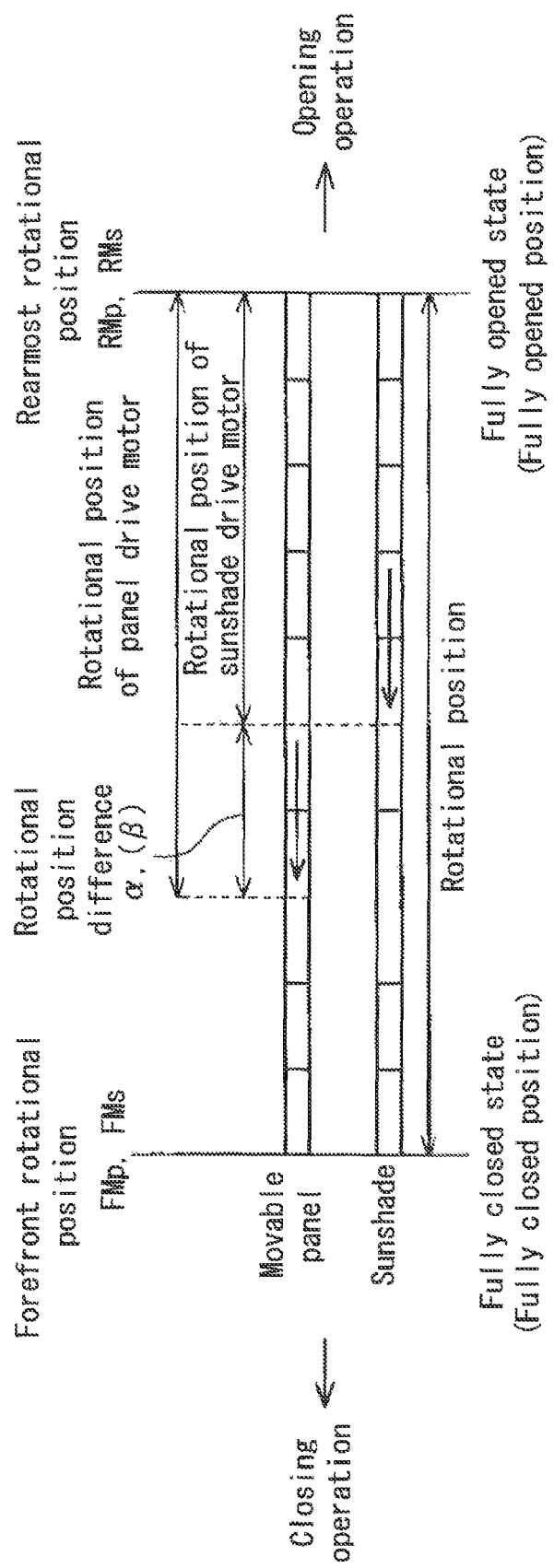
FIG. 3 is an explanatory chart showing a relation between rotational positions of a panel drive motor and a sunshade drive motor.

A relation between the rotational positions Ap and As of the panel drive motor 26 and the sunshade drive motor 36 will be explained as follows with reference to an explanatory chart of FIG. 3. In FIG. 3, for convenience, the rotation range of the panel drive motor 26 from the fully closed state to the fully opened state of the movable panel 15 (that is, the range from forefront rotational position FMp to the rearmost rotational position RMp of the panel drive motor 26) is identical to the rotation range of the sunshade drive motor 36 from the fully closed state to the fully opened state of the sunshade 16 (that is, the range from the forefront rotational position FMs to the rearmost rotational position RMs of the sunshade drive motor 36).

In the condition of FIG. 3, in the case of the closing operation of the movable panel 15 and the sunshade 16, the CPUs 21, 31 control the driving of the panel drive motor 26 and the sunshade drive motor 36, respectively, in such a way that the rotational position Ap of the panel drive motor 26 precedes the rotational position As of the sunshade drive motor 36 toward the fully closed position, that is, in such a way that a difference between the rotational positions Ap and As (i.e., a rotational position difference $\Delta=|Ap-As|$) is equal to or greater than a predetermined rotational position difference $\alpha$. In other words, the CPUs 21, 31 control the driving of the panel drive motor 26 and the sunshade drive motor 36, respectively, in such a way that the rotational position Ap of the panel drive motor 26 precedes the rotational position As of the sunshade drive motor 36 toward the fully closed position by the rotational position difference $\Delta$ that is equal to or greater than the predetermined rotational position difference $\alpha$.

In particular, at the time immediately after the open/close button 27 is pressed by the user or driver for the closing operation in a condition where the movable panel 15 and the sunshade 16 are in the fully opened state, the rotational positions Ap and As of the panel drive motor 26 and the sunshade drive motor 36 are at the rearmost rotational positions RMp and RMs identical to each other. Accordingly, the rotational position difference $\Delta$ between the rotational positions Ap and As of the panel drive motor 26 and the sunshade drive motor 36 is zero. Therefore, the CPU 31 controls the driving of the sunshade drive motor 36 to be waited (delayed) until the rotational position Ap of the panel drive motor 26 precedes the rotational position As (here corresponding to the rearmost rotational position RMs) of the sunshade drive motor 36 toward the fully closed position by the rotational position difference Δ that is equal to or greater than the predetermined rotational difference α after the panel drive motor 26 is started.

Thus, in accordance with the starting of the panel drive motor 26, the rotational position Ap of the panel drive motor 26 precedes the rotational position As of the sunshade drive motor 36 toward the fully closed position by the rotational position difference Δ that is equal to or greater than the predetermined rotational difference α. Afterward, the CPU 31 commands the sunshade drive motor 36 to start. Thereafter, in order to obtain the condition where the rotational position Ap of the panel drive motor 26 precedes the rotational position As of the sunshade drive motor 36 toward the fully closed position, the CPUs 21, 31 control the driving of the panel drive motor 26 and the sunshade drive motor 36, respectively, in such a way that the rotational speed Ns of the sunshade drive motor 36 is lower than the rotational speed Np of the panel drive motor 26. In other words, for example, the rotational speed Np of the panel drive motor 26 is controlled by the CPU 21 to a predetermined rotational speed N1$x$ after the panel drive motor 26 is started. In such case, the CPU 31 controls the driving of the sunshade drive motor 36 so that the rotational speed Ns thereof becomes a predetermined rotational speed N2 (<N1$x$).

In particular, while the panel drive motor 26 and the sunshade drive motor 36 are in operation, for some reasons, the rotational position Ap of the panel drive motor 26 may not precede the rotational position As of the sunshade drive motor 36 toward the fully closed position by the rotational position difference Δ that is equal to or greater than the predetermined rotational difference α. In such case, the CPU 31 controls the driving of the sunshade drive motor 36 so that the rotational speed Ns of the sunshade drive motor 36 becomes a predetermined speed N3 (<N2).

Then, the rotational position Ap of the panel drive motor 26 has reached the forefront rotational position FMp and the movable panel 15 is brought into the fully closed state. At this time, the CPU 21 stops the driving of the panel drive motor 26. Afterward, the rotational position As of the sunshade drive motor 36 has reached the forefront rotational position FMs and the sunshade 16 is brought into the fully closed state. At this time, the CPU 31 stops the driving of the sunshade drive motor 36.

In addition, when the open/close button 27 is pressed by the user or driver for the closing operation in a condition where the movable panel 15 and the sunshade 16 are stopped in a predetermined state, the CPU 31 controls the driving of the sunshade drive motor 36 to be delayed in the manner described above.

As described above, in the case of the closing operation of the movable panel 15 and the sunshade 16, the CPUs 21, 31 control the driving of the panel drive motor 26 and the sunshade drive motor 36, respectively, in such a way that the position of the movable panel 15 precedes the position of the sunshade 16 toward the fully closed position in the closing direction.

In the case of the opening operation of the movable panel 15 and the sunshade 16, the CPUs 21, 31 control the driving of the panel drive motor 26 and the sunshade drive motor 36 in such a manner that the rotational position As of the sunshade drive motor 36 precedes the rotational position Ap of the panel drive motor 26 toward the fully opened position, that is, in such a way that the rotational position difference Δ is equal to or greater than a predetermined rotational position difference β.

In particular, at the time immediately after the open/close button 27 is pressed by the user or driver for the opening operation in a condition where the movable panel 15 and the sunshade 16 are in the fully closed state, the rotational positions Ap and As of the panel drive motor 26 and the sunshade drive motor 36 are at the foremost rotational positions FMp and FMs identical to each other. Accordingly, the rotational position difference Δ between the rotational positions Ap and As of the panel drive motor 26 and the sunshade drive motor 36 is zero. Therefore, the CPU 21 controls the driving of the panel drive motor 26 to be waited (delayed) until that the rotational position As of the sunshade drive motor 36 precedes the rotational position Ap (here corresponding to the foremost rotational position FMp) of the panel drive motor 26 toward the fully opened position by the rotational position difference Δ that is equal to or greater than the predetermined rotational position difference β after the sunshade drive motor 36 is started.

Thus, in accordance with the starting of the sunshade drive motor 36, the rotational position As of the sunshade drive motor 36 precedes the rotational position Ap of the panel drive motor 26 toward the fully opened position by the rotational position difference Δ that is equal to or greater than the predetermined rotational position difference β. Afterward, the CPU 21 commands the panel drive motor 26 to start. Thereafter, in order to obtain the condition where the rotational position As of the sunshade drive motor 36 precedes the rotational position Ap of the panel drive motor 26 toward the fully opened position, the CPUs 21, 31 control the driving of the panel drive motor 26 and the sunshade drive motor 36, respectively, in such a way that the rotational speed Np of the panel drive motor 26 is lower than the rotational speed Ns of the sunshade drive motor 36. In other words, for example, the rotational speed Ns of the sunshade drive motor 36 is controlled by the CPU 31 to a predetermined rotational speed N1 after the sunshade drive motor 36 is started. In such case, the CPU 21 controls the driving of the panel drive motor 26 so that the rotational speed Np thereof becomes a predetermined rotational speed N2$x$ (<N1).

In particular, while the panel drive motor 26 and the sunshade drive motor 36 are in operation, for some reasons, the rotational position As of the sunshade drive motor 36 may not precede the rotational position Ap of the panel drive motor 26 toward the fully opened position by the rotational position difference Δ that is equal to or greater than the predetermined rotational position difference β. In such case, the CPU 21 controls the driving of the panel drive motor 26 so that the rotational speed Np of the panel drive motor 26 becomes a predetermined rotational speed N3$x$ (<N2$x$).

Then, the rotational position As of the sunshade drive motor 36 has reached the rearmost rotational position RMs and the sunshade 16 is brought into the fully opened state. At this time, the CPU 31 stops the driving of the sunshade drive motor 36. Afterward, the rotational position Ap of the panel drive motor 26 has reached the rearmost rotational position RMp and the movable panel 15 is brought into the fully opened state. At this time, the CPU 21 stops the driving of the panel drive motor 26.

In addition, when the open/close button 27 is pressed by the user or driver for the opening operation in a condition where the movable panel 15 and the sunshade 16 are stopped in a predetermined state, the CPU 21 controls the driving of the panel drive motor 26 to be delayed in the manner described above.

As described above, in the case of the opening operation of the movable panel 15 and the sunshade 16, the CPUs 21, 31 control the driving of the panel drive motor 26 and the sunshade drive motor 36, respectively, in such a way that the position of the sunshade 16 precedes the position of the movable panel 15 toward the fully opened in the opening direction.

Next, control configurations of the CPUs 21, 31 for the opening and closing operations of the movable panel 15 and the sunshade 16 will be described as follows, i.e., the control configurations of the CPUs 21, 31 for the driving of the panel drive motor 26 and the sunshade drive motor 36 will be explained blow.

Firstly, the control configuration of the CPUs 21, 31 for the closing operation of the movable panel 15 and the sunshade 16 will be explained. Processing for the closing operation of the movable panel 15 and the sunshade 16 (the processing will be hereinafter referred to as a closing operation processing) is started by an input signal indicating the closing operation by the open/close button 27.

Figure 4:
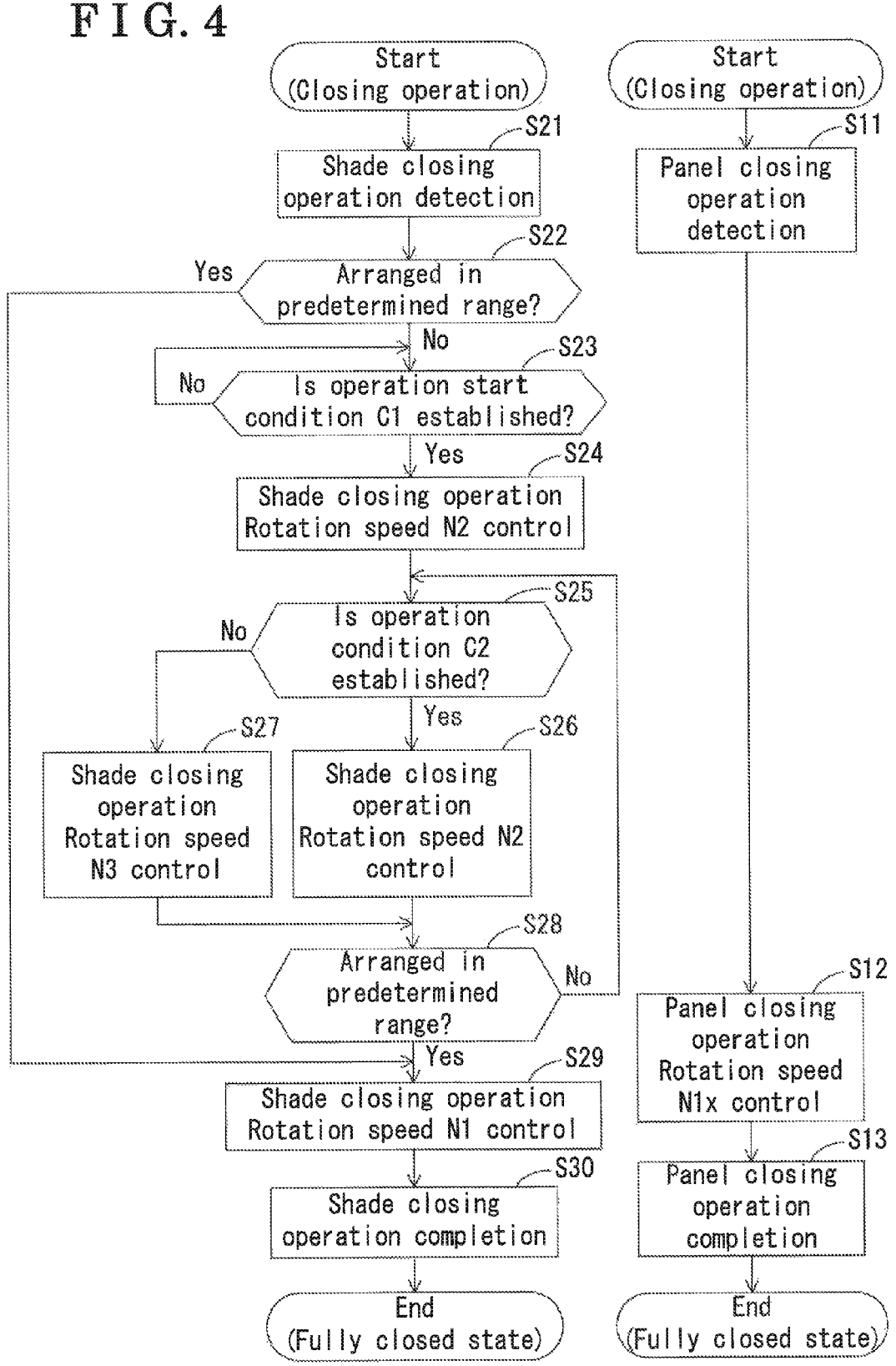
FIG. 4 is a flow chart showing a control configuration when a movable panel and a sunshade move in a closing direction.

As illustrated in FIG. 4, when the closing operation processing is initiated, various information serving as a processing for detecting a closing operation of the movable panel 15 is inputted or processed in the CPU 21 at the panel control unit 20 (S11). Thereafter, for initiating the closing operation of the movable panel 15, the CPU 21 controls the driving of the panel drive motor 26 so that the rotational speed Np thereof becomes the predetermined rotational speed N1x (S12); therefore, the movable panel 15 starts moving in the closing direction. Here, S11, S12, and the like in FIG. 4 indicate Step 11, Step 12, and the like.

Afterward, the CPU 21 determines that the rotational position Ap of the panel drive motor 26 has reached the foremost rotational position FMp along with the closing operation of the movable panel 15 and that the closing operation of the movable panel 15 is completed, i.e., the CPU 21 determines that the movable panel 15 is brought in the fully closed state; therefore, the driving of the panel drive motor 26 is stopped (S13) and the subsequent processing is thereafter finished (End).

In addition, when the aforementioned closing operation processing is initiated, various information serving as a processing for detecting a closing operation of the sunshade 16 is inputted or processed in the CPU 31 at the sunshade control unit 30 (S21) in conjunction with the processing by the CPU 21. Thereafter, the CPU 31 determines whether or not the rotational position Ap of the panel drive motor 26 is arranged in a set range Z1x (S22). The set range Z1x is established corresponding to a case where the sunshade 16 may not substantially reach the fully closed position (fully closed state) before a position (state) of the movable panel 15, which is correlated with the rotational position Ap of the panel drive motor 26, reaches the fully closed position (fully closed state). In other words, the set range Z1x is established, for example, corresponding to a case where the sunshade 16 is in a state right before the sunshade 16 is brought into the fully closed state.

In a case where the CPU 31 determines in S22 that the rotational position Ap of the panel drive motor 26 is not arranged in the set range Z1x, the closing operation processing shifts from S22 to S23 where the CPU 31 determines whether or not an operation start condition C1 is established. The operation start condition C1 is that the rotational position Ap of the panel drive motor 26 precedes the rotational position As of the sunshade drive motor 36 toward the fully closed position by the rotational position difference Δ that is equal to or greater than the predetermined rotational difference α. In a case where the CPU 31 determines in S23 that the operation start condition C1 is established, the closing operation processing shifts from S23 to S24. For initiating the closing operation of the sunshade 16, in S24, the CPU 31 controls the driving of the sunshade drive motor 36 so that the rotational speed Ns thereof becomes the predetermined rotational speed N2 (<N1x); therefore, the sunshade 16 starts moving in the closing direction. That is, the driving of the sunshade drive motor 36 is waited (delayed) until the operation start condition C1 is established.

After S24, the CPU 31 determines whether or not an operation condition C2 is established (S25). In the same way as the operation start condition C1, the operation condition C2 is that the rotational position Ap of the panel drive motor 26 precedes the rotational position As of the sunshade drive motor 36 toward the fully closed position by the rotational position difference Δ that is equal to or greater than the predetermined rotational difference α. In a case where the CPU 31 determines in S25 that the operation condition C2 is established, the closing operation processing shifts from S25 to S26. In S26, the CPU 31 continues to control the driving of the sunshade drive motor 36 so that the rotational speed Ns thereof becomes the predetermined rotational speed N2. On the other hand, in a case where the CPU 31 determines in S25 that the operation condition C2 is not established, the closing operation processing shifts from S25 to S27. In S27, in order to decelerate the closing operation of the sunshade 16, the CPU 31 controls the driving of the sunshade drive motor 36 so that the rotational speed Ns becomes the predetermined rotational speed N3 (<N2).

After S27, the CPU 31 determines whether or not the rotational position Ap of the panel drive motor 26 is arranged in the net range Z1x (S28). In a case where the CPU 31 determines in S28 that the rotational position Ap of the panel drive motor 26 is not arranged in the set range Z1x, the closing operation processing returns to S25 from S28. Therefore, the CPU 31 repeats the controlling of the driving of the sunshade drive motor 36 depending on whether or not the operation condition C2 is established. In addition, in a case where the CPU 31 determines in S28 that the rotational position Ap of the panel drive motor 26 is arranged in the set range Z1x, the closing operation processing shifts from S28 to S29. In S29, the CPU 31 controls the driving of the sunshade drive motor 36 so that the rotational speed Ns thereof becomes the predetermined rotational speed N1 (>N2). In addition, in a case where the CPU 31 determines in S22 that the rotational position Ap of the panel drive motor 26 is arranged in the set range Z1x, the closing operation processing shifts from S22 to S29; thus, the CPU 31 controls the driving of the sunshade drive motor 36 so that the rotational speed Ns thereof becomes the predetermined rotational speed N1 (>N2).

After S29, the CPU 31 determines in S30 that the rotational position As of the sunshade drive motor 36 has reached the foremost rotational position FMs and that the closing operation of the sunshade 16 is completed, i.e., the CPU 31 determines in S30 that the sunshade 16 has reached the fully closed position; therefore, the driving of the sunshade drive motor 36 is stopped and the subsequent processing is thereafter finished (End).

Next, the control configuration of the CPUs 21, 31 for the opening operation of the movable panel 15 and the sunshade 16 will be explained. Processing for the opening operation of the movable panel 15 and the sunshade 16 (the processing will be hereinafter referred to as an opening operation processing) is started by an input signal indicating the opening operation by the open/close button 27.

Figure 5:
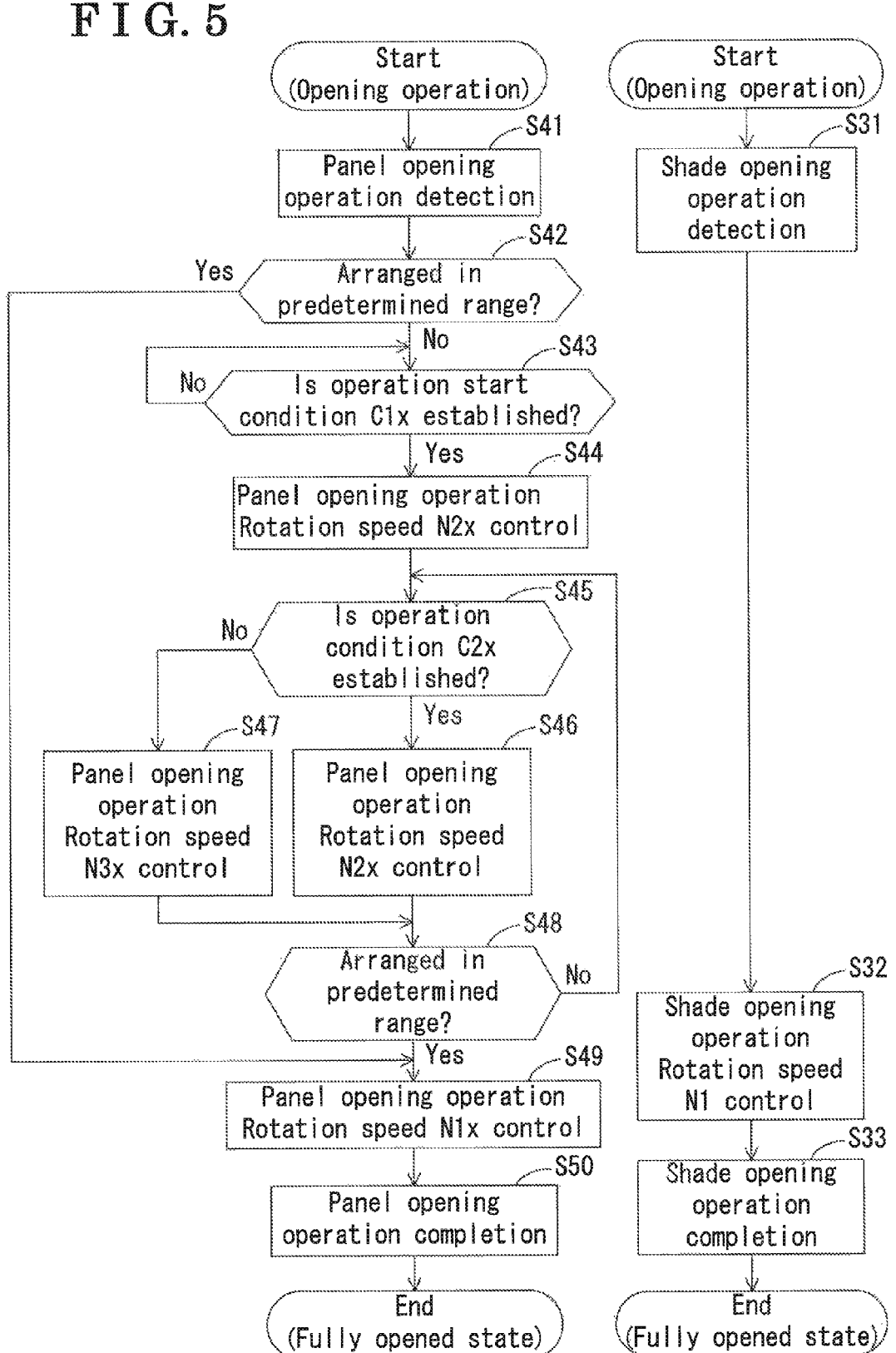
FIG. 5 is a flow chart showing a control configuration when the movable panel and the sunshade move in an opening direction.

As illustrated in FIG. 5, when the opening operation processing is initiated, various information serving as a processing for detecting an opening operation of the sunshade 16 is inputted or processed in the CPU 31 at the sunshade control unit 30 (S31). Thereafter, for initiating the opening operation of the sunshade 16, the CPU 31 controls the driving of the sunshade drive motor 36 so that the rotational speed Ns thereof becomes the predetermine rotational speed N1 (S32); therefore, the sunshade 16 starts moving in the opening direction. Here, S31, S32, and the like in FIG. 5 indicate Step 31, Step 32, and the like.

Afterward, the CPU 31 determines that the rotational position As of the sunshade drive motor 36 has reached the rearmost rotational position RMs along with the opening operation of the sunshade 16 and that the opening operation of the sunshade 16 is completed, i.e., the CPU 31 determines that the sunshade 16 is brought in the fully opened state; therefore, the driving of the sunshade drive motor 36 is stopped (S33) and the subsequent processing is thereafter finished (End).

In addition, when the aforementioned opening operation processing is initiated, various information serving as a processing for detecting an opening operation of the movable panel 15 is inputted or processed in the CPU 21 at the panel control unit 20 (S41) in conjunction with the processing by the CPU 31. Thereafter, the CPU 21 determines whether or not the rotational position As of the sunshade drive motor 36 is arranged in a set range Z1 (S42). The set range Z1 is established corresponding to a case where the movable panel 15 may not substantially reach the fully opened position (fully opened state) before a position (state) of the sunshade 16, which is correlated with the rotational position As of the sunshade drive motor 36, reaches the fully opened position (fully opened state). In other words, the set range Z1 is established, for example, corresponding to a case where the movable panel 15 is in a state right before the movable panel 15 is brought into the fully opened state.

In a case where the CPU 21 determines in S42 that the rotational position As of the sunshade drive motor 36 is not arranged in the set range Z1, the opening operation processing shifts from S42 to S43 where the CPU 21 determines whether or not an operation start condition C1x is established. The operation start condition C1x is that the rotational position As of the sunshade drive motor 36 precedes the rotational position Ap of the panel drive motor 26 toward the fully opened position by the rotational position difference Δ that is equal to or greater than the predetermined rotational position difference β. In a case where the CPU 21 determines in S43 that the operation start condition C1x is established, the opening operation processing shifts from S43 to S44. For initiating the opening operation of the movable panel 15, in S44, the CPU 21 controls the driving of the panel drive motor 26 so that the rotational speed Np thereof becomes the predetermined rotational speed N2x (<N1); therefore, the movable panel 15 starts moving in the opening direction. That is, the driving of the panel drive motor 26 is waited (delayed) until the operation start condition C1x is established.

After S44, the CPU 21 determines whether or not an operation condition C2x is established (S45). In the same way as the operation start condition C1x, the operation condition C2x is that the rotational position As of the sunshade drive motor 36 precedes the rotational position Ap of the panel drive motor 26 toward the fully opened position by the rotational position difference Δ that is equal to or greater than the predetermined rotational position difference β. In a case where the CPU 21 determines in S45 that the operation condition C2x is established, the opening operation processing shifts from S45 to S46. In S46, the CPU 21 continues to control the driving of the panel drive motor 26 so that the rotational speed Np thereof becomes the predetermined rotational speed N2x. On the other hand, in a case where the CPU 21 determines in S45 that the operation condition C2x is not established, the opening operation processing shifts from S45 to S47. In S47, in order to decelerate the opening operation of the movable panel 15, the CPU 21 controls the driving of the panel drive motor 26 so that the rotational speed Np becomes the predetermined rotational speed N3x (<N2x).

After S47, the CPU 21 determines whether or not the rotational position As of the sunshade drive motor 36 is arranged in the set range Z1 (S48). In a case where the CPU 21 determines in S48 that the rotational position As of the sunshade drive motor 36 is not arranged in the set range Z1, the opening operation processing returns to S45 from S48. Therefore, the CPU 21 repeats the controlling of the driving of the panel drive motor 26 depending on whether or not the operation condition C2x is established. In addition, in a case where the CPU 21 determines in S48 that the rotational position As of the sunshade drive motor 36 is arranged in the set range Z1, the opening operation processing shifts from S48 to S49. In S49, the CPU 21 controls the driving of the panel drive motor 26 so that the rotational speed Np thereof becomes the predetermined rotational speed N1x (>N2x). In addition, in a case where the CPU 21 determines in S42 that the rotational position As of the sunshade drive motor 36 is arranged in the set range Z1, the opening operation processing shifts from S42 to S49; thus, the CPU 21 controls the driving of the panel drive motor 26 so that the rotational speed Np thereof becomes the predetermined rotational speed N1x (>N2x).

After S49, the CPU 21 determines in S50 that the rotational position Ap of the panel drive motor 26 has reached the rearmost rotational position RMp and that the opening operation of the movable panel 15 is completed. i.e., the CPU 21 determines in S50 that the movable panel 15 has reached the fully opened position; therefore, the driving of the panel drive motor 26 is stopped and the subsequent processing is thereafter finished (End).

Next, an over view of the operation of the sunroof apparatus 10 according to the embodiment will be explained as follows. At the time of the closing operation of the movable panel 15 and the sunshade 16, the CPUs 21, 31 control the driving of the panel drive motor 26 and the sunshade drive motor 36 by the establishment of the operation start condition C1 and the operation condition C2 so that the position (state) of the movable panel 15 precedes the position (state) of the sunshade 16 toward the fully closed position (fully closed state) in the closing direction. Accordingly, the sunshade 16 is restricted from being brought into the fully closed state before the movable panel 15 is brought into the fully closed state. Consequently, for example, in a case where the movable panel 15 may not be completely shifted to the fully closed state, the sunshade 16 is not yet in the fully closed state; therefore, a status of the movable panel 15 may be visually checked from a compartment of the vehicle. In particular, the movable panel 15 tilts up and down (see FIG. 1B) while being moving toward the fully closed state. In the midst of the tilting-up and tilting-down operations of the movable panel 15, the sunshade 16 is not yet brought in the fully closed state. Therefore, a status of the movable panel 15 may be visually checked from the compartment of the vehicle.

On the other hand, at the time of the opening operation of the movable panel 15 and the sunshade 16, the CPUs 21, 31 control the driving of the panel drive motor 26 and the sunshade drive motor 36 by the establishment of the operation start condition C1x and the operation condition C2x so that the position (state) of the sunshade 16 precedes the position (state) of the movable panel 15 toward the fully opened position (fully opened state) in the opening direction. Consequently, for example, the movable panel 15 is restricted from being brought into the fully opened state before the sunshade 16 is brought into the fully opened state.

As described above, according to the aforementioned embodiment, the following effects may be obtained. (1) According to the embodiment, the sunshade 16 is restricted from being brought into the fully closed state before the movable panel 15 is brought into the fully closed state. Accordingly, for example, in a case where the movable panel 15 may not be completely shifted to the fully closed state, the sunshade 16 is not yet in the fully closed state; therefore, a status of the movable panel 15 may be visually checked from the compartment from the vehicle. In addition, the movable panel 15 is restricted from being left incompletely closed without being brought in the fully closed state and the sunshade 16 is prevented from being contaminated by rain or dirt.

(2) According to the embodiment, the movable panel 15 is restricted from being brought into the fully opened state before the sunshade 16 is brought into the fully opened state. Therefore, in a condition where the movable panel 15 is in the fully opened state, the sunshade 16 is completely shifted to the fully opened state. As a result, for example, while the vehicle is in a moving mode, noises generated due to fluttering of the sunshade 16 that receives wind may be restricted.

(3) In the embodiment, in a case where the movement of the movable panel 15 in conjunction with the sunshade 16 is not taken into consideration, the movable panel 15 may be opened and closed by the panel drive motor 26, the pulse sensor 28, and the panel control unit 20. Likewise, in a case where the movement of the sunshade 16 in conjunction with the movable panel 15 is not taken into consideration, the sunshade 16 may be opened and closed by the sunshade drive motor 36, the pulse sensor 38, and the sunshade control unit 30. Thus, the communication circuits 25, 35 are additionally applied to existing configurations for opening and closing the movable panel 15 and the sunshade 16 so that the panel control unit 20 and the sunshade control unit 30 are configured to operate in conjunction with each other. As a result, the configuration of the sunroof apparatus 10 according to the embodiment may be obtained by a relatively simple modification to the existing configurations.

(4) According to the embodiment, in a condition where the movable panel 15 is in the midst of the tilt-up operation, the sunshade 16 is yet in the opened state. Therefore, for example, while the vehicle is in a moving mode, noises generated due to fluttering of the sunshade 16 that receives wind may be restricted.

(5) According to the embodiment, in a case where the movable panel 15 and the sunshade 16 move in the opening and closing directions in conjunction with each other, variations in motor characteristics and mechanical configurations of the panel drive motor 26 and the sunshade drive motor 36, a difference between slide resistances in the operations of the panel drive motor 26 and the sunshade drive motor 36, a difference between temperature characteristics of the panel drive motor 26 and the sunshade drive motor 36, and the like do not need to be considered. In addition, the rotational positions Ap and As of the panel drive motor 26 and the sunshade drive motor 36, and the like are monitored with one another by the panel control unit 20 and the sunshade control unit 30. As a result, the aforementioned precedence between a position (state) of one of the movable panel 15 and the sunshade 16 and a position (state) of the other of the movable panel 15 and the sunshade 16 between the fully closed and opened states may be consistently restricted from being reversed during the opening and closing operations.

(6) According to the embodiment, the CPU 31 controls the driving of the sunshade drive motor 36 to be delayed until the operation start condition C1 is established (Yes in S23). At this time, a computing load of the CPU 31 may be reduced.

Likewise, the CPU 21 controls the driving of the panel drive motor 26 to be delayed until the operation start condition C1$x$ is established (Yes in S43). At this time, a computing load of the CPU 21 may be reduced.

(7) According to the embodiment, even in a case where the operation condition C2 is not established (No in S25), the CPU 31 controls the sunshade drive motor 36 so that the rotational speed N2 thereof shifts to the rotational speed N3 and continues to control the driving of the sunshade drive motor 36. Therefore, the user may recognize the closing operation of the sunshade 16 and the like. As a result, the user may not misunderstand that the closing operation of the sunshade 16 is in an inappropriate state, for example, in a case where the CPU 31 stops the driving of the sunshade drive motor 36 when the operation condition C2 is not established (No in S25).

Likewise, even in a case where the operation condition C2$x$ is not established (No in S45), the CPU 21 controls the panel drive motor 26 so that the rotational speed N2$x$ thereof shifts to the rotational speed N3$x$ and continues to control the driving of the panel drive motor 26. Therefore, the user may recognize the closing operation of the movable panel 15 and the like. As a result, the user may not misunderstand the closing operation of the movable panel 15 is an inappropriate state, for example, in a case where the CPU 21 stops the driving of the panel drive motor 26 when the operation condition C2$x$ is not established (No in S45).

Figure 6:
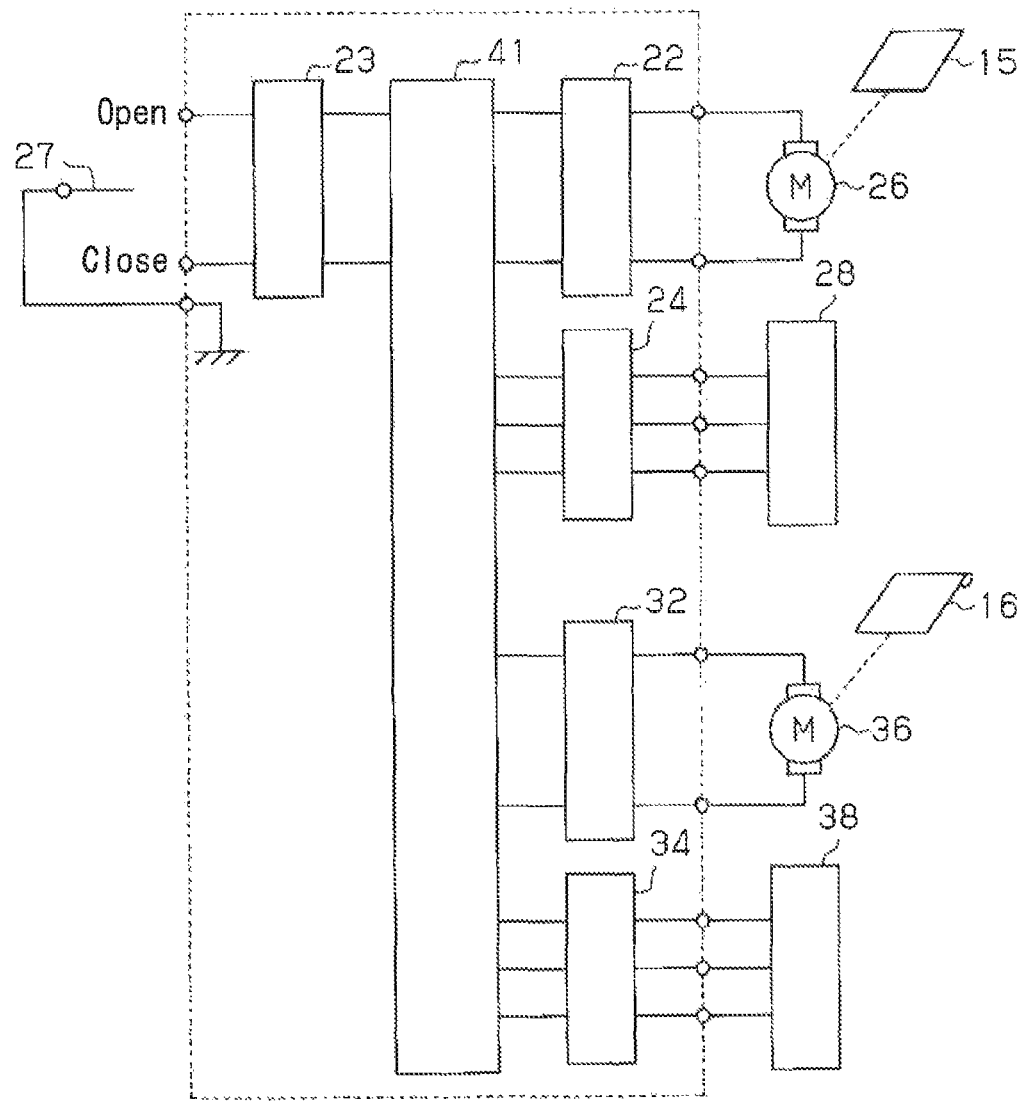
FIG. 6 is a block diagram illustrating an electrical configuration of the sunroof apparatus according to a modified example of the embodiment disclosed here.
Figure 6:
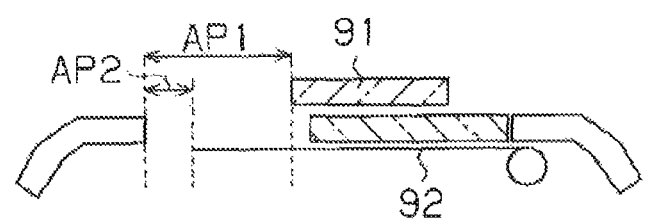

In addition, the aforementioned embodiment may be modified as follows. As illustrated in FIG. 6, according to a modified example of the embodiment, the communication circuits 25, 35 are excluded from the sunroof apparatus 10. In addition, a CPU 41 in which the functions of the CPUs 21, 31 are integrated is applied to the sunroof apparatus 10 according to the modified example of the embodiment. That is, all of the drive circuits 22, 32 and the input circuits 23, 24, 34 are connected to the CPU 41 and thus the driving of the panel drive motor 26 and the sunshade drive motor 36 may be integrally controlled by the CPU 41.

According to the embodiment, the panel control unit 20 and the sunshade control unit 30 are electrically connected to each other by the communication circuits 25, 35. Alternatively, a higher control unit (for example, a main ECU) integrally controlling the panel control unit 20 and the sunshade control unit 30 may be utilized to control the communication circuits 25, 35 separately.

According to the embodiment, the operation start condition C1 for the closing operation is that the rotational position Ap of the panel drive motor 26 precedes the rotational position As of the sunshade drive motor 36 toward the fully closed position by the rotational position difference Δ that is equal to or greater than the predetermined rotational difference α. Alternatively, the operation start condition C1 may be established as a condition A that a predetermined delay time has elapsed after the driving of the panel drive motor 26 is started. Further alternatively, the operation start condition C1 may be established as a condition B that the rotational speed Np of the panel drive motor 26 is greater than the rotational speed Ns of the sunshade drive motor 36. Moreover, the operation start condition C1 may be a combination of at least two or more of the aforementioned operation start condition C1 and the conditions A and B.

Likewise, according to the embodiment, the operation condition C2 for the closing operation is that the rotational position Ap of the panel drive motor 26 precedes the rotational position As of the sunshade drive motor 36 toward the fully closed position by the rotational position difference Δ that is equal to or greater than the predetermined rotational difference α. Alternatively, the operation condition C2 may be established as the condition B that the rotational speed Np of the panel drive motor 26 is greater than the rotational speed Ns of the sunshade drive motor 36. Moreover, the operation condition C2 may be a combination of the aforementioned operation condition C2 and the condition B.

According to the embodiment, the operation start condition C1x for the opening operation is that the rotational position As of the sunshade drive motor 36 precedes the rotational position Ap of the panel drive motor 26 toward the fully opened position by the rotational position difference Δ that is equal to or greater than the predetermined rotational position difference β. Alternatively, the operation start condition C1x may be established as a condition Ax that a predetermined delay time has elapsed after the driving of the sunshade drive motor 36 is started. Further alternatively, the operation start condition C1x may be established as a condition Bx that the rotational speed Ns of the sunshade drive motor 36 is greater than the rotational speed Np of the panel drive motor 26. Moreover, the operation start condition C1x may be a combination of at least two or more of the aforementioned operation start condition C1x and the conditions Ax and Bx.

Likewise, according to the embodiment, the operation condition C2x for the opening operation is that the rotational position As of the sunshade drive motor 36 precedes the rotational position Ap of the panel drive motor 26 toward the fully opened position by the rotational position difference Δ that is equal to or greater than the predetermined rotational position difference β. Alternatively, the operation condition C2x may be established as the condition Bx that the rotational speed Ns of the sunshade drive motor 36 is greater than the rotational speed Np of the panel drive motor 26. Moreover, the operation condition C2x may be a combination of the aforementioned operation condition C2x and the condition Bx.

According to the embodiment, in a case where the open/close button 27 is pressed for the closing operation to therefore start the driving of the panel drive motor 26, the CPU 31 controls the driving of the sunshade drive motor 36 to be waited (delayed) until the rotational position Ap of the panel drive motor 26 precedes the rotational position As of the sunshade drive motor 36 toward the fully closed position by the rotational position difference Δ that is equal to or greater than the predetermined rotational difference α, i.e., the CPU 31 controls the driving of the sunshade drive motor 36 to be waited until the operation start condition C1 is established (Yes in S23). Alternatively, the CPU 31 may control the driving of the sunshade drive motor 36 so that the rotational speed Ns thereof becomes sufficiently small compared to the rotational speed Np (=N1x) of the panel drive motor 26 until the rotational position Ap of the panel drive motor 26 precedes the rotational position As of the sunshade drive motor 36 toward the fully closed position by the rotational position difference Δ that is equal to or greater than the predetermined rotational difference α (until the operation start condition C1 is established, i.e., Yes in S23). In such case, the CPU 31 controls to the sunshade drive motor 36 to start: therefore, the user may recognize the closing operation of the sunshade 16 and the like. As a result, the user may not misunderstand the closing operation of the sunshade 16 is in an inappropriate state, for example, in a case where the CPU 31 controls the driving of the sunshade drive motor 36 to be delayed.

According to the embodiment, while the panel drive motor 26 and the sunshade drive motor 36 are in operation, for some reasons, the rotational position Ap of the panel drive motor 26 may not precede the rotational position As of the sunshade drive motor 36 toward the fully closed position by the rotational position difference Δ that is equal to or greater than the predetermined rotational difference α (No in S25). In such case, the CPU 31 controls the driving of the sunshade drive motor 36 so that the rotational speed Ns thereof becomes the predetermined rotational speed N3 (<N2). Alternatively, the CPU 31 may control the driving of the sunshade drive motor 36 to stop temporally (to be delayed). At this time, a computing load of the CPU 31 may be reduced.

According to the embodiment, after the operation start condition C1 is established (Yes in S23), the CPU 31 may control the driving of the sunshade drive motor 36 so that the rotational speed Ns thereof is equal to the rotational speed Np (the rotational speed N1x) of the panel drive motor 26. Likewise, according to the embodiment, after the operation condition C2 is established (Yes in S25), the CPU 31 may control the driving of the sunshade drive motor 36 so that the rotational speed Ns thereof is equal to the rotational speed Np (the rotational speed N1x) of the panel drive motor 26.

In the case where the CPU 31 controls the driving of the sunshade drive motor 36 so that the rotational speed Ns thereof is equal to the rotational speed Np (N1x) of the panel drive motor 26 as described above, for example, the rotational speed N1x is equal to the rotational speed Ns of the sunshade drive motor 36 when a duty ratio is 100%. In such case, a computing load of the CPU 31 controlling the driving of the sunshade drive motor 36 (by the PWM control) may be reduced. Alternatively, in the case that the rotational speed N1x of the panel drive motor 26 is equal to the rotational speed N1 of the sunshade drive motor 36 and in the case that the driving of the sunshade drive motor 36 is delayed (stopped) when the operation start condition C1 is not established (No in S23) and when the operational condition C2 is not established (No in S25), the PWM control for the sunshade drive motor 36 is eliminated and thus the operation of the sunshade drive motor 36 may be controlled only by starting and stopping the sunshade drive motor 36.

According to the embodiment, in a case where the open/close button 27 is pressed for the opening operation to therefore start the driving of the sunshade drive motor 36, the CPU 21 controls the driving of the panel drive motor 26 to be waited (delayed) until the rotational position As of the sunshade drive motor 36 precedes the rotational position Ap of the panel drive motor 26 toward the fully opened position by the rotational position difference Δ that is equal to or greater than the predetermined rotational position difference β, i.e., the CPU 21 controls the driving of the panel drive motor 26 to be waited until the operation start condition C1x is established (Yes in S43). Alternatively, the CPU 21 may control the driving of the panel drive motor 26 so that the rotational speed Np thereof becomes sufficiently small compared to the rotational speed Ns (=N1) of the sunshade drive motor 36 until the rotational position As of the sunshade drive motor 36 precedes the rotational position Ap of the panel drive motor 26 toward the fully opened position by the rotational position difference Δ that is equal to or greater than the predetermined rotational position difference β (until the operation start condition C1x is established, i.e., Yes in S43). In such case, the CPU 21 controls the panel drive motor 26 to start; therefore, the user may recognize the opening operation of the movable panel 15 and the like. As a result, the user may not misunderstand the opening operation of the movable panel 15 is in an inappropriate state, for example, in a case where the CPU 21 controls the driving of the panel drive motor 26 to be delayed.

According to the embodiment, while the panel drive motor 26 and the sunshade drive motor 36 are in operation, for some reasons, the rotational position As of the sunshade drive motor 36 may not precede the rotational position Ap of the panel drive motor 26 toward the fully opened position by the rotational position difference Δ that is equal to or greater than the predetermined rotational position difference β (No in S45). In such case, the CPU 21 controls the driving of the panel drive motor 26 so that the rotational speed Np thereof becomes the predetermined rotational speed N3x (<N2x). Alternatively, the CPU 21 may control the driving of the panel drive motor 26 to stop temporally (to be delayed). At this time, a computing load of the CPU 21 may be reduced.

According to the embodiment, after the operation stars condition C1x is established (Yes in S43), the CPU 21 may control the driving of the panel drive motor 26 so that the rotational speed Np thereof is equal to the rotational speed Ns (the rotational speed N1) of the sunshade drive motor 36. Likewise, according to the embodiment, after the operation condition C2x is established (Yes in S45), the CPU 21 may control the driving of the panel drive motor 26 so that the rotational speed Np thereof is equal to the rotational speed Ns (the rotational speed N1) of the sunshade drive motor 36.

In the case where the CPU 21 controls the driving of the panel drive motor 26 so that the rotational speed Np thereof is equal to the rotational speed Ns (N1) of the sunshade drive motor 36 as described above, for example, the rotational speed N1 is equal to the rotational speed Np of the panel drive motor 26 when a duty ratio is 100%. In such case, a computing load of the CPU 21 controlling the driving of the panel drive motor 26 (by the PWM control) may be reduced. Alternatively, in the case that the rotational speed N1 of the sunshade drive motor 36 is equal to the rotational speed N1x of the panel drive motor 26 and in the case that the driving of the panel drive motor 26 is delayed (stopped) when the operation start condition C1x is not established (No in S43) and when the operational condition C2x is not established (No in S45), the PWM control for the panel drive motor 26 is eliminated and thus the operation of the panel drive motor 26 may be controlled only by starting and stopping the panel drive motor 26.

According to the embodiment, at the time of the closing operation of the movable panel 15 and the sunshade 16, the rotational position difference Δ of the rotational position Ap of the panel drive motor 26 relative to the rotational position As of the sunshade drive motor 36 is set to be equal to or greater than a predetermined value (the predetermined rotational difference α) so that the rotational position Ap of the panel drive motor 26 precedes the rotational position As of the sunshade drive motor 36. Alternatively, the predetermine value may be changed, for example, depending on the rotational position Ap of the panel drive motor 26, that is, depending on a position (state) of the movable panel 15 relative to the fully closed position (the fully closed state). For example, the predetermined rotational difference α may be corrected so as to increase as the movable panel 15 is moving toward the fully closed position. Likewise, according to the embodiment, at the time of the opening operation of the movable panel 15 and the sunshade 16, the rotational position difference Δ of the rotational position As of the sunshade drive motor 36 relative to the rotational position Ap of the panel drive motor 26 is set to be equal to or greater than a predetermined value (the predetermined rotational difference β) so that the rotational position As of the sunshade drive motor 36 precedes the rotational position Ap of the panel drive motor 26. Alternatively, the predetermined value may be changed, for example, depending on the rotational position As of the sunshade drive motor 36, that is, depending on a position (state) of the sunshade 16 relative to the fully opened position (the fully opened state). For example, the predetermined rotational difference β may be corrected so as to increase as the sunshade 16 is moving toward the fully opened position.

According to the embodiment, for convenience, the rotation range of the panel drive motor 26 between the fully closed and opened states of the movable panel 15 (that is, the range from forefront rotational position FMp to the rearmost rotational position RMp) is set to be identical to the rotation range of the sunshade drive motor 36 between the fully closed and opened states of the sunshade 16 (that is, the range from the forefront rotational position FMs to the rearmost rotational position RMs). Alternatively, the rotation range of the panel drive motor 26 between the fully closed and opened states of the movable panel 15 may not be identical to the rotation range of the sunshade drive motor 36 between the fully closed and opened states of the sunshade 16. For example, the rotation range from the foremost rotational position FMs to the rearmost rotational position RMs of the sunshade drive motor 36 is greater than the rotation range from the foremost rotational position FMp to the rearmost rotational position RMp of the panel drive motor 26. In such case, the CPUs 21, 31 may be configured to control the driving of the panel drive motor 26 and the sunshade drive motor 36 so that the rotational range of the sunshade drive motor 36 is reduced and so that the rotational ranges of the panel drive motor 26 and the sunshade drive motor 36 apparently are equal to each other. In addition, the CPUs 21, 31 may be configured to control the driving of the panel drive motor 26 and the sunshade drive motor 36 so that the relation shown in FIG. 3 is established in consideration for the reduced amount of the rotational range of the sunshade drive motor 36. Moreover, even in a case where the rotation range from the foremost rotational position FMs to the rearmost rotational position RMs of the sunshade drive motor 36 is greater than the rotation range from the foremost rotational position FMp to the rearmost rotational position RMp of the panel drive motor 26, the CPUs 21, 31 may be configured to control the driving of the panel drive motor 26 and the sunshade drive motor 36 so that the relation shown in FIG. 3 is established.

In the embodiment, in the case that the rotational speed N1x is the rotational speed Np of the panel drive motor 26 when a duty ratio is 100%, a computing load of the CPU 21 controlling the panel drive motor 26 (by the PWM control) may be reduced. Likewise, in the embodiment, in the case that the rotational speed N1 is the rotational speed Ns of the sunshade drive motor 36 when a duty ratio is 100%, a computing load of the CPU 31 controlling the sunshade drive motor 36 (by the PWM control) may be reduced.

According to the embodiment, in the case that the panel drive motor 26 is controlled at a predetermined speed (for example, at the rotational speed N1x) by the PWM control, the panel drive motor 26 may be controlled, for example, by a feedback control based on the rotational speed Np. Likewise, according to the embodiment, in the case that the sunshade drive motor 36 is controlled at a predetermined speed (for example, at the rotational speed N1) by the PWM control, the sunshade drive motor 36 may be controlled, for example, by a feedback control based on the rotational speed Ns.

According to the embodiment, the rotational position Ap of the panel drive motor 26 is detected by the pulse sensor 28; thereby, a position (state) of the movable panel 15 between the fully closed and opened positions (fully closed and opened states) is detected. Alternatively, a position (state) of the movable panel 15 between the fully closed and opened positions (fully closed and opened states) may be detected by a sensor (including a switch) that may monitor a correspondence relation between the rotational position Ap and the position (the state including a tilted-up state) of the movable panel 15. Likewise, according to the embodiment, the rotational position As of the sunshade drive motor 36 is detected by the pulse sensor 38; thereby, a position (state) of the sunshade 16 between the fully closed and opened positions (fully closed and opened states) is detected. Alternatively, a position (state) of the sunshade 16 between the fully closed and opened positions (fully closed and opened states) may be detected by a sensor (including a switch) that may monitor a correspondence relation between the rotational position As and the position (state) of the sunshade 16.

According to the embodiment, the open/close button 27 may be an open/close button arranged at the sunshade control unit 30 for moving the sunshade 16 in the opening and closing directions. In addition, the open/close button 27 arranged at the sunshade control unit 30 is pressed by the user for the opening and closing operations; therefore, the movable panel 15 may be moved in the opening and closing directions.

According to the embodiment, the sunroof apparatus 10 conducting the pop-up operation of the movable panel 15 is applied. Alternatively, a sunroof apparatus in which the movable panel 15 slides in a manner maintained in a tilted-up state, or a sunroof apparatus in which the movable panel 15 slides under the fixed panel 13 (a so-called inner slide operation) may be applied as the sunroof apparatus 10 according to the embodiment.

According to the embodiment, the sunshade 16 is rolled up and out by the roll-up shaft 17. Alternatively, the sunshade 16 may be a slidable sunshade formed, for example, by a plate member. In addition, the movable panel 15 of the sunroof apparatus 10 is applied in the embodiment. Alternatively, a movable panel (that is, a glass window) of a power window apparatus may be applied in the embodiment.

As described above, according to the aforementioned embodiment, the sunroof apparatus 10 includes the panel drive motor 26 moving the movable panel 15 in the opening and closing directions, the pulse sensor 28 monitoring a position of the movable panel 15 between the fully closed and opened positions, the sunshade drive motor 36 moving the sunshade 16 in the opening and closing directions, the pulse sensor 38 monitoring a position of the sunshade 16 between the fully closed and opened positions, and the control devices 20, 30 controlling the driving of the panel drive motor 26 and the sunshade drive motor 36 on the basis of the position of the movable panel 15 monitored by the pulse sensor 28 and the position of the sunshade 16 monitored by the pulse sensor 38, so that the position of the movable panel 15 precedes the position of the sunshade 16 toward the fully closed position when the movable panel 15 and the sunshade 16 move in the closing direction.

According to the aforementioned configuration, the control devices 20, 30 control the driving of the panel drive motor 26 and the sunshade drive motor 36 on the basis of the position of the movable panel 15 monitored by the pulse sensor 28 and the position of the sunshade 16 monitored by the pulse sensor 38, so that the position of the movable panel 15 precedes the position of the sunshade 16 toward the fully closed position when the movable panel 15 and the sunshade 16 move in the closing direction. Accordingly, for example, the sunshade 16 may be restricted from being brought into the fully closed position before the movable panel 15 is brought into the fully closed position. Therefore, even in a case where the movable panel 15 is not completely shifted to the fully closed position, the sunshade 16 is not yet in the fully closed position; therefore, a status of the movable panel 15 may be visually checked from the compartment of the vehicle. In addition, the movable panel 15 may be restricted from being left incompletely closed without being brought in the fully closed position.

According to the aforementioned embodiment, the control devices 20, 30 control the driving of the panel drive motor 26 and the sunshade drive motor 36 on the basis of the position of the movable panel 15 monitored by the pulse sensor 28 and the position of the sunshade 16 monitored by the pulse sensor 38, so that the position of the sunshade 16 precedes the position of the movable panel 15 toward the fully opened position when the movable panel 15 and the sunshade 16 move in the opening direction.

According to the aforementioned configuration, for example, the movable panel 15 may be restricted from being brought into the fully opened position before the sunshade 16 is brought into the fully opened position. Therefore, in a condition where the movable panel 15 is in the fully opened position, the sunshade 16 is completely shifted to the fully opened position. As a result, for example, while the vehicle is in a moving mode, noises generated due to fluttering of the sunshade 16 that receives wind may be restricted.

According to the aforementioned embodiment, the control devices 20, 30 include the panel control unit 20 receiving the position of the movable panel 15 monitored by the pulse sensor 28 and controlling the driving of the panel drive motor 26 on the basis of the position of the movable panel 15, the sunshade control unit 30 receiving the position of the sunshade 16 monitored by the pulse sensor 38 and controlling the driving of the sunshade drive motor 36 on the basis of the position of the sunshade 16, the communication circuits 25, 35 communicating the position of the movable panel 15 received by the panel control unit 20 and the position of the sunshade 16 received by the sunshade control unit 30 between the panel control unit 20 and the sunshade control unit 30. At least one of the panel control unit 20 and the sunshade control unit 30 controls the driving of the panel drive motor 26 or the sunshade drive motor 36 on the basis of the position of the movable panel 15 received by the panel control unit 20 or communicated between the panel control unit 20 and the sunshade control unit 30 and the position of the sunshade 16 received by the sunshade control unit 30 or communicated between the panel control unit 20 and the sunshade control unit 30, so that the position of the movable panel 15 precedes the position of the sunshade 16 toward the fully closed position when the movable panel 15 and the sunshade 16 move in the closing direction.

According to the aforementioned configuration, in a case where the movement of the movable panel 15 in conjunction with the sunshade 16 is not taken into consideration, the movable panel 15 may be opened and closed by the panel drive motor 26, the pulse sensor 28, and the panel control unit 20. Likewise, in a case where the movement of the sunshade 16 in conjunction with the movable panel 15 is not taken into consideration, the sunshade 16 may be opened and closed by the sunshade drive motor 36, the pulse sensor 38, and the sunshade control unit 30. Thus, the communication circuits 25, 35 are additionally applied to existing configurations for opening and closing the movable panel 15 and the sunshade 16, so that the panel control unit 20 and the sunshade control unit 30 are configured to operate in conjunction with each other. As a result, the configuration of the sunroof apparatus 10 according to the embodiment may be obtained by a relatively simple modification to the existing configurations.

According to the aforementioned embodiment, the panel control unit 20 and the sunshade control unit 30 control the rotational speeds Np and Ns of the panel drive motor 26 and the sunshade drive motor 36, respectively, so that the position of the movable panel 15 precedes the position of the sunshade 16 toward the fully closed position when the movable panel 15 and the sunshade 16 move in the closing direction.

According to the aforementioned configuration, when the position of the movable panel 15 precedes the position of the sunshade 16 toward the fully closed position at the time of the closing operation, the panel control unit 20 and the sunshade control unit 30 control the rotational speeds Np and Ns of the panel drive motor 26 and the sunshade drive motor 36 to thereby move the movable panel 15 and the sunshade 16 in the closing direction in conjunction with each other. Therefore, the user may recognize the closing operation of the movable panel 15 and the sunshade 16. As a result, the user may not misunderstand that the closing operation of the sunshade 16 is in an inappropriate state, for example, in a case where the sunshade drive motor 36 is controlled so that sunshade 16 may not start moving in the closing direction in order to allow the position of the movable panel 15 to precede the position of the sunshade 16 toward the fully closed position.

According to the aforementioned embodiment, the sunshade control unit 30 controls the driving of the sunshade drive motor 36 to be delayed so that the position of the movable panel 15 precedes the position of the sunshade 16 toward the fully closed position when the movable panel 15 and the sunshade 16 move in the closing direction.

According to the aforementioned configuration, for example, the sunshade control unit 30 controls the driving of the sunshade drive motor 36 so as not to start or to be delayed; thereby, the position of the movable panel 15 may precede the position of the sunshade 16 toward the fully closed position when the movable panel 15 and the sunshade 16 move in the closing direction. At this time, a computing load of the sunshade control unit 30 may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An opening-and-closing member control apparatus, comprising:
    a panel drive device moving a movable panel in opening and closing directions;
    a panel monitoring device monitoring a position of the movable panel between fully closed and opened positions;
    a sunshade drive device moving a sunshade in opening and closing directions;
    a sunshade monitoring device monitoring a position of the sunshade between fully closed and opened positions; and
    a control device controlling driving of the panel drive device and the sunshade drive device on the basis of the position of the movable panel monitored by the panel monitoring device and the position of the sunshade monitored by the sunshade monitoring device, so that the position of the movable panel precedes the position of the sunshade toward the fully closed position when the movable panel and the sunshade move between fully closed and opened positions.

2. The opening-and-closing member control apparatus according to claim 1, wherein the control device controls the driving of the panel drive device and the sunshade drive device on the basis of the position of the movable panel monitored by the panel monitoring device and the position of the sunshade monitored by the sunshade monitoring device, so that the position of the sunshade precedes the position of the movable panel toward the fully opened position when the movable panel and the sunshade move in the opening direction.

3. The opening-and-closing member control apparatus according to claim 1, wherein the control device comprises:
    a panel control device receiving the position of the movable panel monitored by the panel monitoring device and controlling the driving of the panel drive device on the basis of the position of the movable panel;
    a sunshade control device receiving the position of the sunshade monitored by the sunshade monitoring device and controlling the driving of the sunshade drive device on the basis of the position of the sunshade; and
    a communication device communicating the position of the movable panel received by the panel control device and the position of the sunshade received by the sunshade control device between the panel control device and the sunshade control device, and
    wherein at least one of the panel control device and the sunshade control device controls the driving of the panel drive device or the sunshade drive device on the basis of the position of the movable panel received by the panel control device or communicated between the panel control device and the sunshade control device and the position of the sunshade received by the sunshade control device or communicated between the panel control device and the sunshade control device, so that the position of the movable panel precedes the position of the sunshade toward the fully closed position when the movable panel and the sunshade move in the closing direction.

4. The opening-and-closing member control apparatus according to claim 1, wherein the control device controls speeds of the panel drive device and the sunshade drive device, respectively, so that the position of the movable panel precedes the position of the sunshade toward the fully closed position when the movable panel and the sunshade move in the closing direction.

5. The opening-and-closing member control apparatus according to claim 1, wherein the control device controls the driving of the sunshade drive device to be delayed so that the position of the movable panel precedes the position of the sunshade toward the fully closed position when the movable panel and the sunshade move in the closing direction.

6. An opening-and-closing member control apparatus, comprising:
    a panel drive device moving a movable panel in opening and closing directions;
    a panel monitoring device monitoring a position of the movable panel between fully closed and opened positions;
    a sunshade drive device moving a sunshade in opening and closing directions;
    a sunshade monitoring device monitoring a position of the sunshade between fully closed and opened positions; and a control device controlling driving of the panel drive device and the sunshade drive device on the basis of the position of the movable panel monitored by the panel monitoring device and the position of the sunshade monitored by the sunshade monitoring device, so that the position of the movable panel precedes the position of the sunshade toward the fully closed position when the movable panel and the sunshade move in the closing direction;

wherein the control device controls speeds of the panel drive device and the sunshade drive device, respectively, so that the position of the movable panel precedes the position of the sunshade toward the fully closed position when the movable panel and the sunshade move in the closing direction.

* * * * *